United States Patent [19]

McWhirter et al.

[11] Patent Number: 5,713,206
[45] Date of Patent: *Feb. 3, 1998

[54] GAS TURBINE ULTRA LOW NOX COMBUSTOR

[75] Inventors: Anthony McWhirter, Niagara Falls; Eugenio Colautti, Mississauga, both of Canada; David J. Amos, Orlando, Fla.

[73] Assignee: Westinghouse Electric Corporation, Pittsburgh, Pa.

[*] Notice: The term of this patent shall not extend beyond the expiration date of Pat. No. 5,361,586.

[21] Appl. No.: 623,059

[22] Filed: Oct. 17, 1994

Related U.S. Application Data

[63] Continuation of Ser. No. 46,320, Apr. 15, 1993, Pat. No. 5,361,586.
[51] Int. Cl.$^6$ .................................................. F23R 3/32
[52] U.S. Cl. .............................. 60/747; 60/737; 60/739
[58] Field of Search .................... 60/742, 747, 39.822, 60/737, 748, 723, 739

[56] References Cited

U.S. PATENT DOCUMENTS

| | | |
|---|---|---|
| 4,112,676 | 9/1978 | DeCorso . |
| 4,534,165 | 8/1985 | David, Jr. et al. . |
| 5,321,948 | 6/1994 | Leonard . |
| 5,361,586 | 11/1994 | McWhirter et al. ............ 60/747 |
| 5,479,782 | 1/1996 | Parker et al. ..................... 60/747 |

FOREIGN PATENT DOCUMENTS

| | | |
|---|---|---|
| 0029619A1 | 3/1981 | European Pat. Off. . |
| 0526152A1 | 3/1993 | European Pat. Off. . |
| 638109 | 5/1950 | France . |
| 1099959 | 1/1968 | United Kingdom . |
| 2094464 | 9/1982 | United Kingdom . |

OTHER PUBLICATIONS

Patent Abstracts of Japan, vol. 14, No.460 (M–1032) 4 Oct. 1990 & JP–A–02 183 720 (Hitachi) 18 Jul. 1990.

*Primary Examiner*—Charles G. Freay

[57] ABSTRACT

A gas turbine combustor having a pre-mixing zone and a combustion zone separated by a barrier plate. A plurality of concentrically arranged annular passages, into which lean mixtures of fuel and air are introduced, are disposed in the pre-mixing zone. Each of the annular passages has a discharge end in which a plurality of swirlers are circumferentially arranged that allow fuel/air mixtures flowing through the annular passages to enter the combustion zone, the swirlers acting as flame holders. A toroidal fuel manifold upstream of each of the annular passages allows the fuel/air ratio in each annular passage to be individually controlled. The firing temperature of the combustor is increased by sequentially supplying fuel to each annular passage in turn, with the innermost passages being supplied with fuel first. A pilot fuel assembly is centrally disposed with respect to the annular passages and has swirler vanes and an ignitor.

16 Claims, 6 Drawing Sheets

GAS TURBINE ULTRA LOW NOX COMBUSTOR

This is a Continuation of application Ser. No. 08/046,320, filed Apr. 15, 1993, now U.S. Pat. No. 5,361,586.

BACKGROUND OF THE INVENTION

The present invention relates to a combustor for burning fuel in compressed air. More specifically, the present invention relates to a combustor for a gas turbine that significantly reduces the amount of NOx produced by combustion.

In a gas turbine, fuel is burned in compressed air, produced by a compressor, in one or more combustors. Traditionally, such combustors had a primary combustion zone in which an approximately stoichiometric mixture of fuel and air was formed and burned in a diffusion type combustion process. Additional air was introduced into the combustor downstream of the primary combustion zone. Although the overall fuel/air ratio was considerably less than stoichiometric, the fuel/air mixture was readily ignited at start-up and good flame stability was achieved over a wide range in firing temperatures due to the locally richer nature of the fuel/air mixture in the primary combustion zone.

Unfortunately, use of such approximately stoichiometric fuel/air mixtures resulted in very high temperatures in the primary combustion zone. Such high temperatures promoted the formation of oxides of nitrogen ("NOx"), considered an atmospheric pollutant. Although it is known that combustion at lean fuel/air ratios reduces NOx formation, such lean mixtures are difficult to ignite and exhibit poor flame stability.

It is therefore desirable to provide a combustor capable of stable combustion with very lean mixtures of fuel and air, so as to reduce the formation of NOx, as well as one that permits reliable ignition at start-up.

SUMMARY OF THE INVENTION

Accordingly, it is the general object of the current invention to provide a combustor capable of stable combustion with very lean mixtures of fuel and air, so as to reduce the formation of NOx, as well as one that permits reliable ignition at start-up.

Briefly, this object, as well as other objects of the current invention, is accomplished in a gas turbine having a compressor for compressing air, a combustor for producing a hot gas by burning a fuel in the compressed air, and a turbine for expanding the hot gas produced by the combustor. The combustor has (i) a plurality of concentrically arranged annular passages each having an inlet end and a discharge end, (ii) a first fuel discharge port for each of the annular passages for introducing a fuel therein, and (iii) means for separately controlling the introduction of fuel into each of the annular passages via its fuel discharge port. In one embodiment, the combustor also has a plurality of swirlers for each of the annular passages that form an array distributed circumferentially around their respective annular passages. In this embodiment, the means for separately controlling the introduction of fuel into each of the annular passages via its fuel discharge port comprises an approximately toroidal manifold for each of the annular passages, each of the toroidal manifolds being disposed upstream of its respective annular passage.

The current invention also encompasses a method of burning fuel in compressed air, comprising the steps of (i) introducing a first stream of a fuel and air mixture into a central portion of a combustion zone, the fuel and air mixture in the first stream having a fuel to air ratio of at least about 0.04 by weight, (ii) igniting the first stream of fuel and air so as to create a central pilot flame in the combustion zone, (iii) introducing a second stream of a fuel and air mixture into a first portion of the combustion zone surrounding the central portion, the second fuel/air stream being introduced after the pilot flame is established, thereby creating a second flame surrounding the pilot flame, the second fuel/air stream having a fuel to air ratio of less than 0.035 by weight, and (iv) introducing a third stream of a fuel and air mixture into a second portion of the combustion zone surrounding the first portion, the third fuel/air stream being introduced after the second flame is established, thereby creating a third flame surrounding the second flame, the third fuel/air stream having a fuel to air ratio of less than 0.035 by weight.

DESCRIPTION OF THE PREFERRED EMBODIMENT

Figures 1, 3:
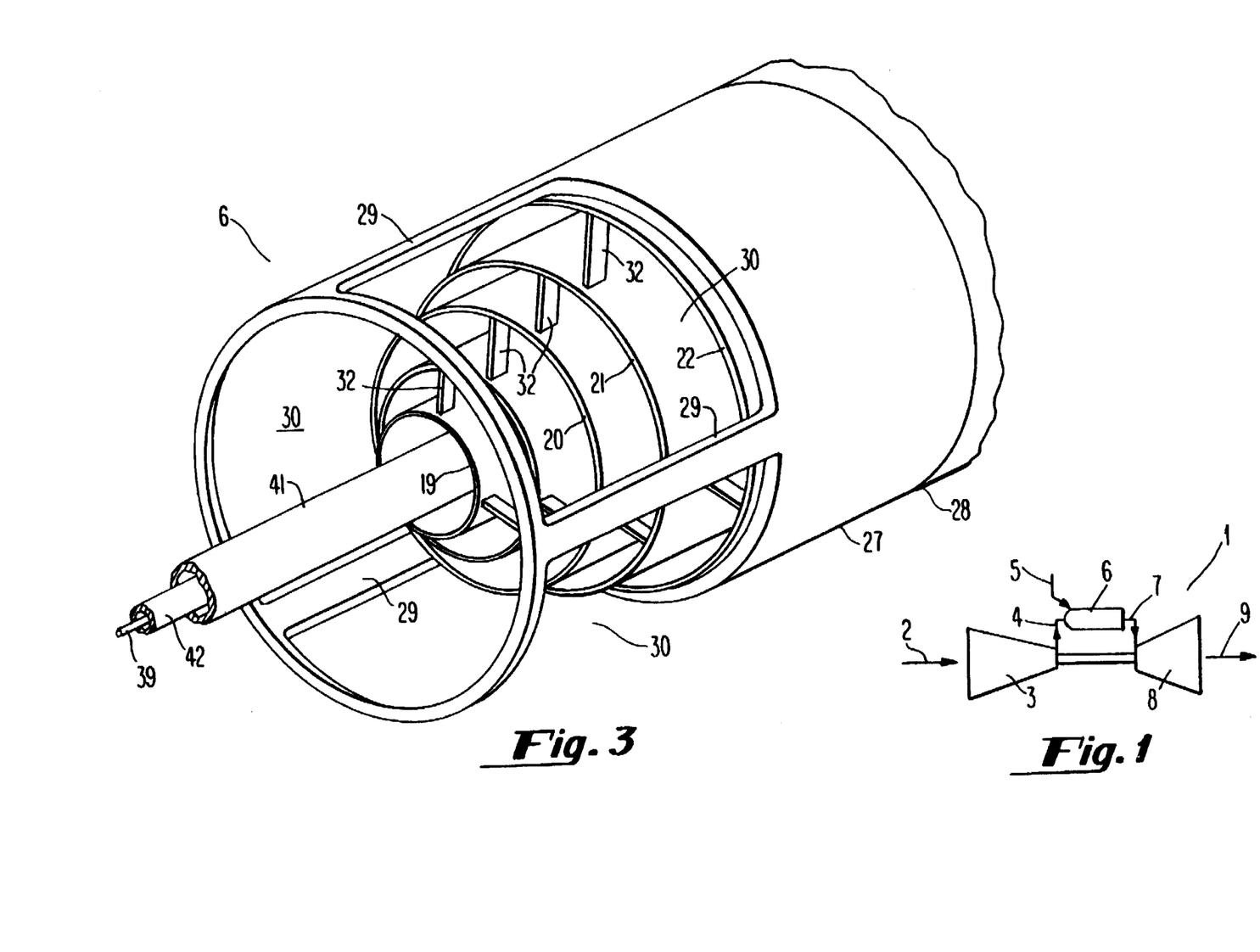
FIG. 1 is a schematic diagram of a gas turbine employing the combustor according to the current invention.
FIG. 3 is an isometric view of the front portion of the combustor shown in FIG. 2.

Referring to the drawings, there is shown in FIG. 1 a gas turbine 1. As is conventional, the gas turbine is comprised of a compressor 3 into which ambient air 2 is drawn. The compressor 3 discharges compressed air 4 to a combustor 6 in which a fuel 5 is burned to produce a hot gas 7. The hot gas 7 is expanded in a turbine 8 and then discharged as exhaust gas 9.

Figure 2:
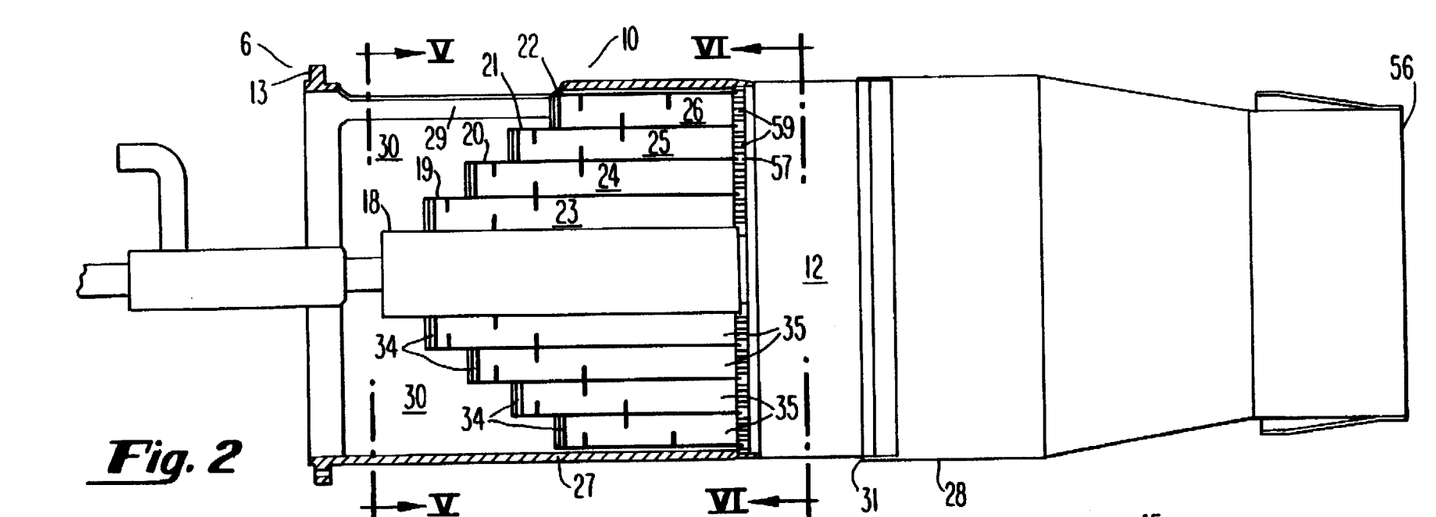
FIG. 2 is a longitudinal cross-section through the combustor of the current invention.

The current invention concerns the combustor 6 for the gas turbine 1—specifically, a combustor designed to generate very low levels of NOx (e.g., less than approximately 9 ppmv when the gas turbine is operating at its base load firing temperature and without the use of water or steam injection). As shown in FIGS. 2 and 3, the combustor 6 according to the current invention comprises a pre-mixing zone 10, in which air and fuel are mixed, and a combustion zone 12 downstream of the pre-mixing zone. A housing 27, having a flange 13 at its front end, encloses the mixing zone 10 of the combustor 6. Three large window-type openings 30 are equally spaced around the circumference of the housing 27. A duct 28 is attached to the aft end of the housing 27 and encloses the combustion zone 12. Cooling passages 31 are formed around the circumference of the duct 28 so as to allow the introduction of film cooling air. An outlet 56 is formed at the aft end of the duct 28 for discharging the hot gas produced in the combustor 6 to the turbine 8.

Figure 4:
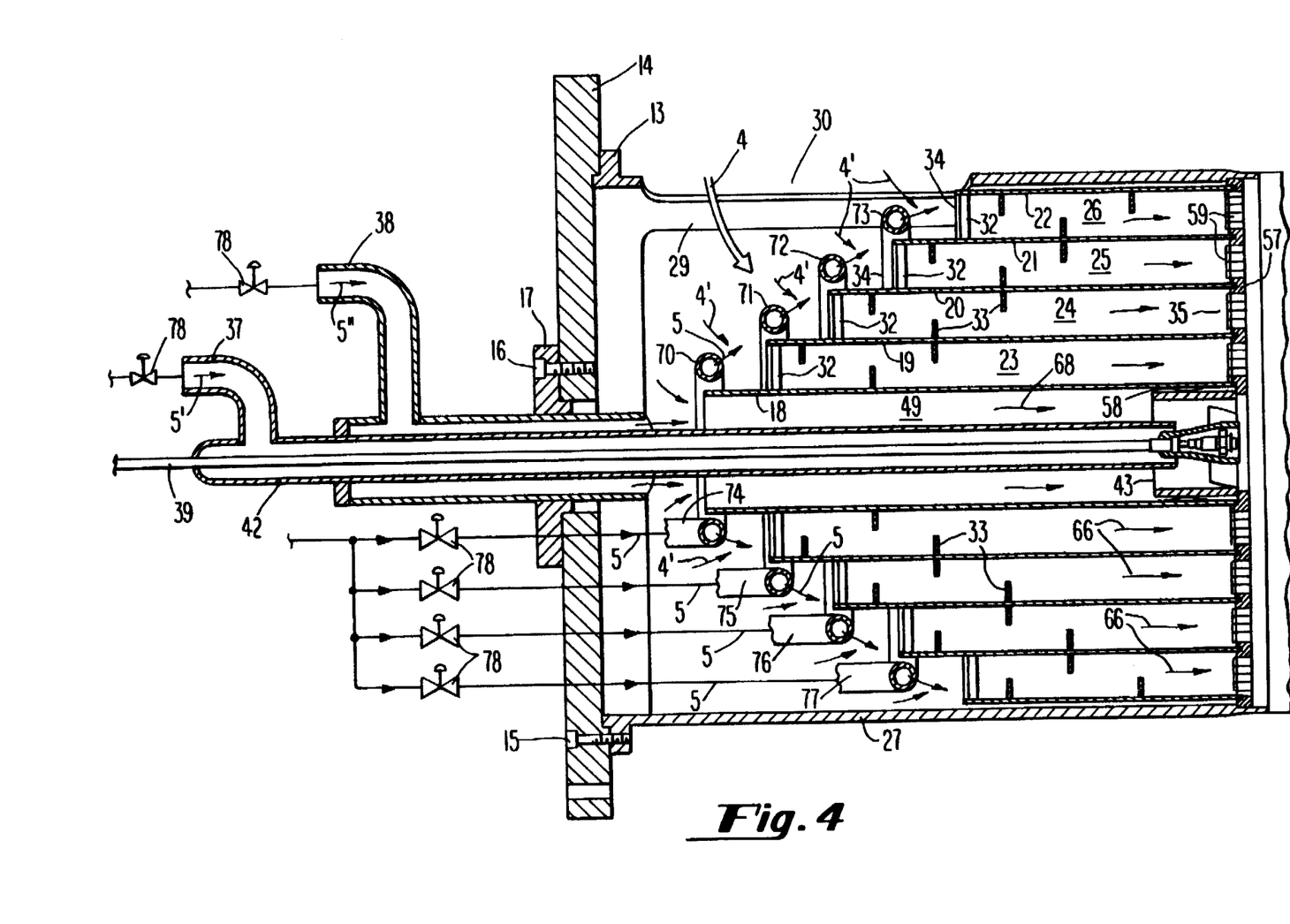
FIG. 4 is a longitudinal cross-section through the front portion of the combustor shown in FIG. 2 with the fuel piping and ignitor installed.

As shown in FIG. 4, the front flange 13 of the housing 27 is mounted onto a plate 14, via screws 15, to facilitate mounting the combustor 6 into the combustion section of the gas turbine 1. As also shown in FIG. 4, five cylindrical liners 18–22 are concentrically arranged in the mixing zone 10 of the combustor 6 so as form four annular passages 23–26, one annular passage being formed between each adjacent pair of liners. Each of the annular passages has an inlet end 34 and a discharge end 35. Support struts 32 are disposed adjacent the inlets 34 of each of the annular passages to strengthen the structure. A barrier plate 57 is attached at the aft end of the liners 18–22, adjacent the discharges 35 of the annular passages, and separates the mixing portion 10 of the combustor from the combustion zone 12.

Figure 5:
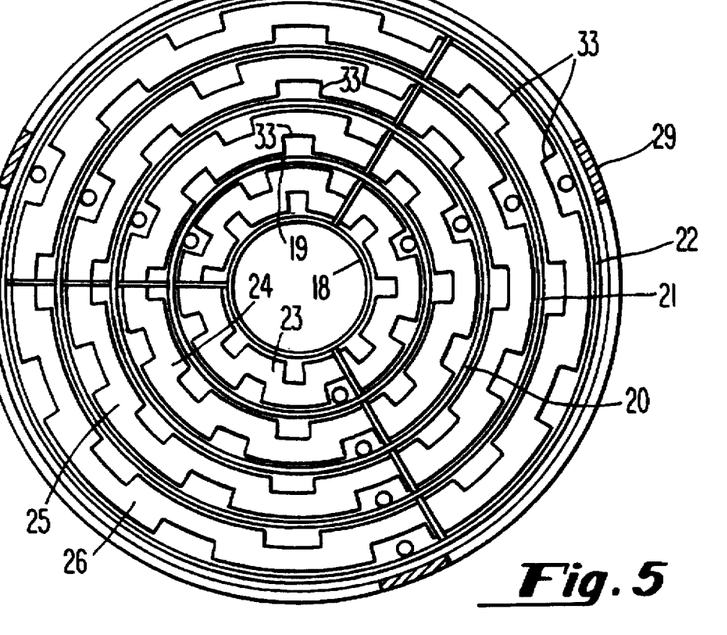
FIG. 5 is a cross-section through line V—V shown in FIG. 2.
Figure 6:
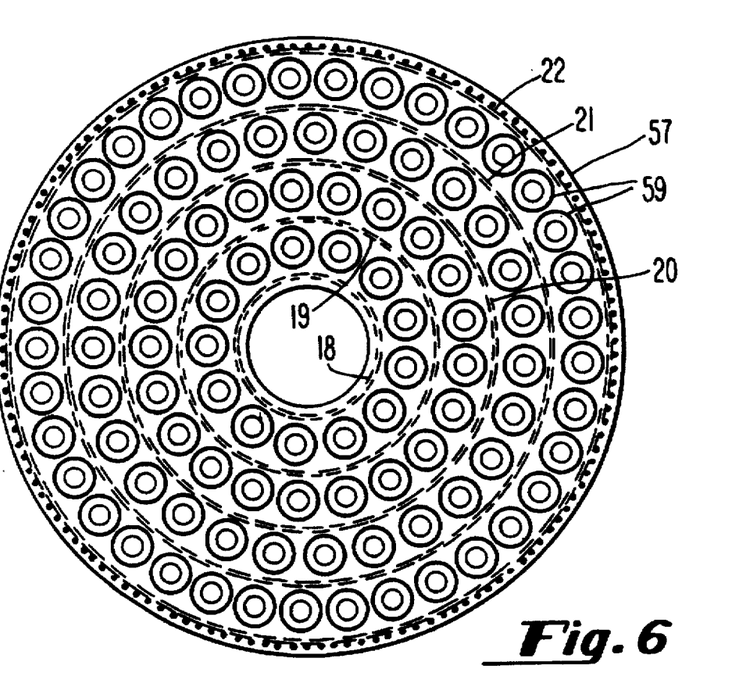
FIG. 6 is a cross-section through line VI—VI shown in FIG. 2.
Figure 9:
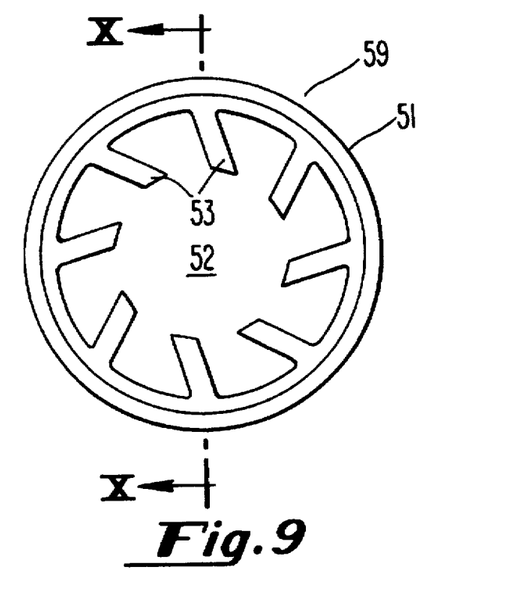
FIG. 9 is a front view of one of the swirlers shown in FIG. 2.
Figure 10:
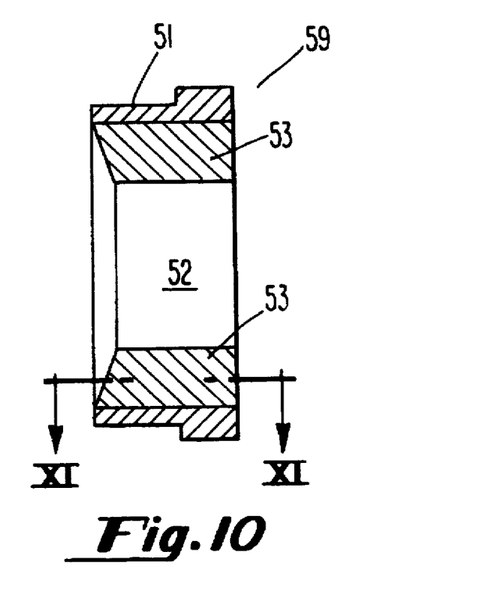
FIG. 10 is a cross-section through line X—X shown in FIG. 9.

As shown best in FIG. 5, a plurality of baffles 33 extend both radially inward and outward from the liners 18–22 into the annular passages 23–26 around which the baffles are circumferentially distributed. As shown best in FIG. 6, a plurality of swirlers 59 are disposed in the barrier plate 57 so as to be circumferentially distributed around each of the annular passages 23–26 adjacent their discharges 35. A typical swirler 59 is shown in FIGS. 9 and 10 and is comprised of an outer ring from which a plurality of vanes 53 extend. The swirler vanes 53 are adapted to impart rotation to the fuel and air flowing through the swirler 59. In so doing, they promote mixing of the fuel and air and cause recirculation that serves to anchor the flame. A centrally disposed passage 52 is formed within the swirler 59 that allows fluid to flow through the barrier plate 57 without passing through the swirler vanes 53. By leaving some of the passages 52 open and plugging others, the amount of air flowing through each swirlers 59 can be adjusted to improve stability.

Figure 11:
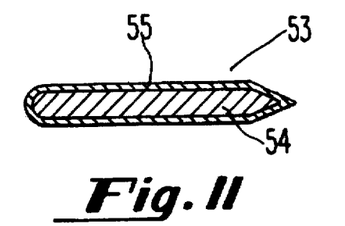
FIG. 11 is a cross-section through line XI—XI shown in FIG. 10.

As shown in FIG. 11, in the preferred embodiment of the invention, each of the vanes is comprised of a metallic core 54 that has been coated with a catalytic material 55, such as a palladium and platinum composition, that promotes combustion at low temperatures and, hence, reduces the production of NOx. Suitable catalytic coatings may be obtained through Precision Combustion, Inc., of New Haven, Conn.

Figure 12:
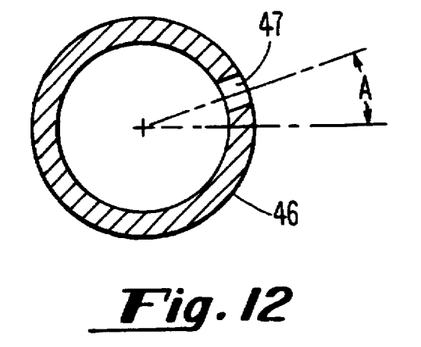
FIG. 12 is a cross-section through the fuel conduit shown in FIG. 4.

As shown in FIG. 4, a fuel assembly is disposed in the combustor 6. The fuel assembly is comprised of four concentric toroidal manifolds 70–73. Each fuel manifold 70–73 is disposed just upstream of the inlet 34 of one of the annular passages 23–26. A plurality of rearward facing fuel discharge ports 47, one of which is shown in FIG. 12, are distributed around the circumference of each of the manifolds 70–73. In the preferred embodiment of the invention, the discharge ports 47 are spaced approximately 2 cm (0.75 inches) apart so that the fuel 5 is evenly distributed around the circumference of the annular passages 23–26. In addition, each of the fuel discharge ports 47 is oriented at an angle A, as shown in FIG. 12, of approximately 18° so that it directs the fuel 5 at an angle into the radially outboard regions of each of the annular passages 23–26, as shown in FIG. 4, to promote mixing.

As shown in FIG. 4, one of four axially extending fuel supply tubes 74–77 connects to each of the four fuel manifolds 70–73 so that each manifold is supplied with fuel 5 by a separate fuel supply tube. A flow control valve 78 is installed in each fuel supply tube 74–77 in order to control the flow of fuel 5 from a fuel supply (not shown) to each fuel supply tube. Thus, according to the current invention, the supply of fuel to each annular passage 23–26 can be separately controlled. In the preferred embodiment, the fuel is a gaseous fuel, such as natural gas.

Figure 7:
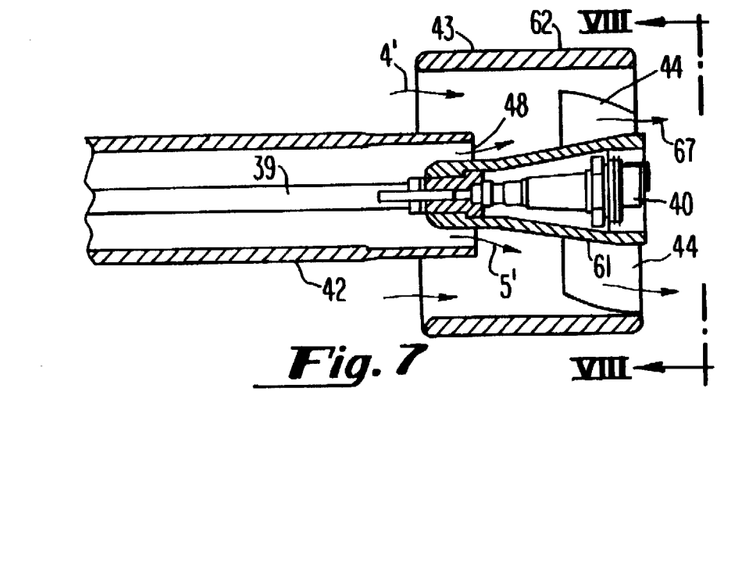
FIG. 7 is an enlarged view of the pilot section of the combustor shown in FIG. 4.
Figure 8:
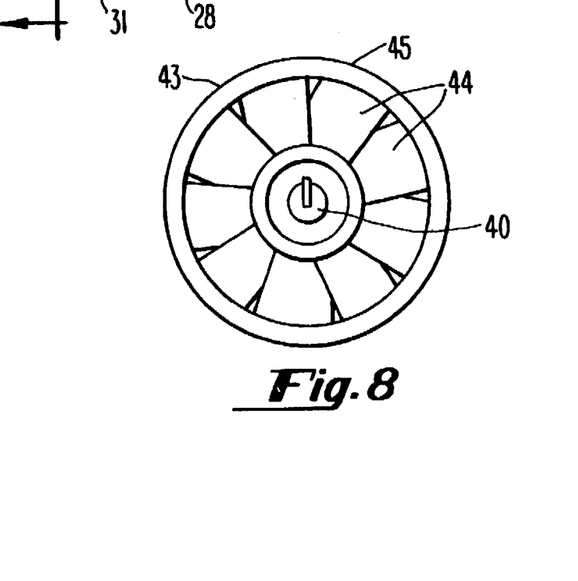
FIG. 8 is a view taken along line VIII—VIII shown in FIG. 7.

As shown in FIG. 4, the combustor 6 is also provided with a pilot fuel assembly, mounted on the plate 14 by screws 16 that extend through a plate 17. The pilot assembly includes a fuel pipe 37 that supplies pilot fuel 5' to a pilot fuel tube 42. As shown best in FIG. 7, the pilot fuel tube 42 discharges fuel 5' to a pilot fuel/air swirler 43 located within the innermost liner 18 and centered therein by spring clips 58, shown in FIG. 4. As shown in FIG. 7, the pilot 43 is comprised of inner and outer rings 61 and 62, respectively, and a plurality of swirler vanes 44 extending between the rings. The swirler vanes 44 are adapted to impart rotation to the air and fuel flowing through the pilot 43, thereby ensuring good stability. An ignitor 40, which may be of the conventional spark-gap type, is disposed within the inner ring 61 such that its tip extends just beyond the pilot 43. An electrical conduit 39 extending through the pilot fuel tube 42 supplies power to the ignitor 40.

Not all of the fuel supplied to the combustor 6 flows through the fuel manifolds 70–73, which supply fuel 5 to the annular passages 23–26, and the pilot fuel tube 42. A fuel pipe 38, shown in FIG. 4, also supplies fuel 5", referred to as supplemental pilot fuel. The fuel pipe 38 discharges the supplemental pilot fuel 5" to a conduit 41 that surrounds a portion of the pilot fuel tube 42. From the conduit 41, the supplemental pilot fuel 5" is directed to an annular passage 49 formed between the innermost liner 18 and the pilot fuel tube 42.

The operation of the combustor 6 is as follows. Although operation of only one combustor is discussed, it should be understood that the gas turbine 1 may incorporate a number of such combustors 6. During start-up, the compressor 3 is spun-up to ignition speed, typically approximately 18% to 20% of design speed, by a starting motor (not shown). As the compressor rotor (not shown) accelerates, compressed air 4 from the compressor 3 flows into the combustor 6 through the three large window-type inlets 30, as shown in FIG. 4. After entering the combustor 6, the air is divided into five streams 4'—one stream flowing through each of the five annular passages 49 and 23–26.

When ignition speed is reached, pilot fuel 5' is introduced via the fuel pipe 37 and the pilot fuel tube 42. As shown in FIG. 7, in the pilot swirler 43, the pilot fuel 5' mixes in sufficient quantity with the air 4' flowing through annular passage 49 to provide a suitable mixture 67 of fuel and air to achieve ignition, i.e., a local fuel/air ratio of at least about 0.04 by weight. Combustion is established by supplying power, before the introduction of pilot fuel 5', to the ignitor 40.

Figure 13:
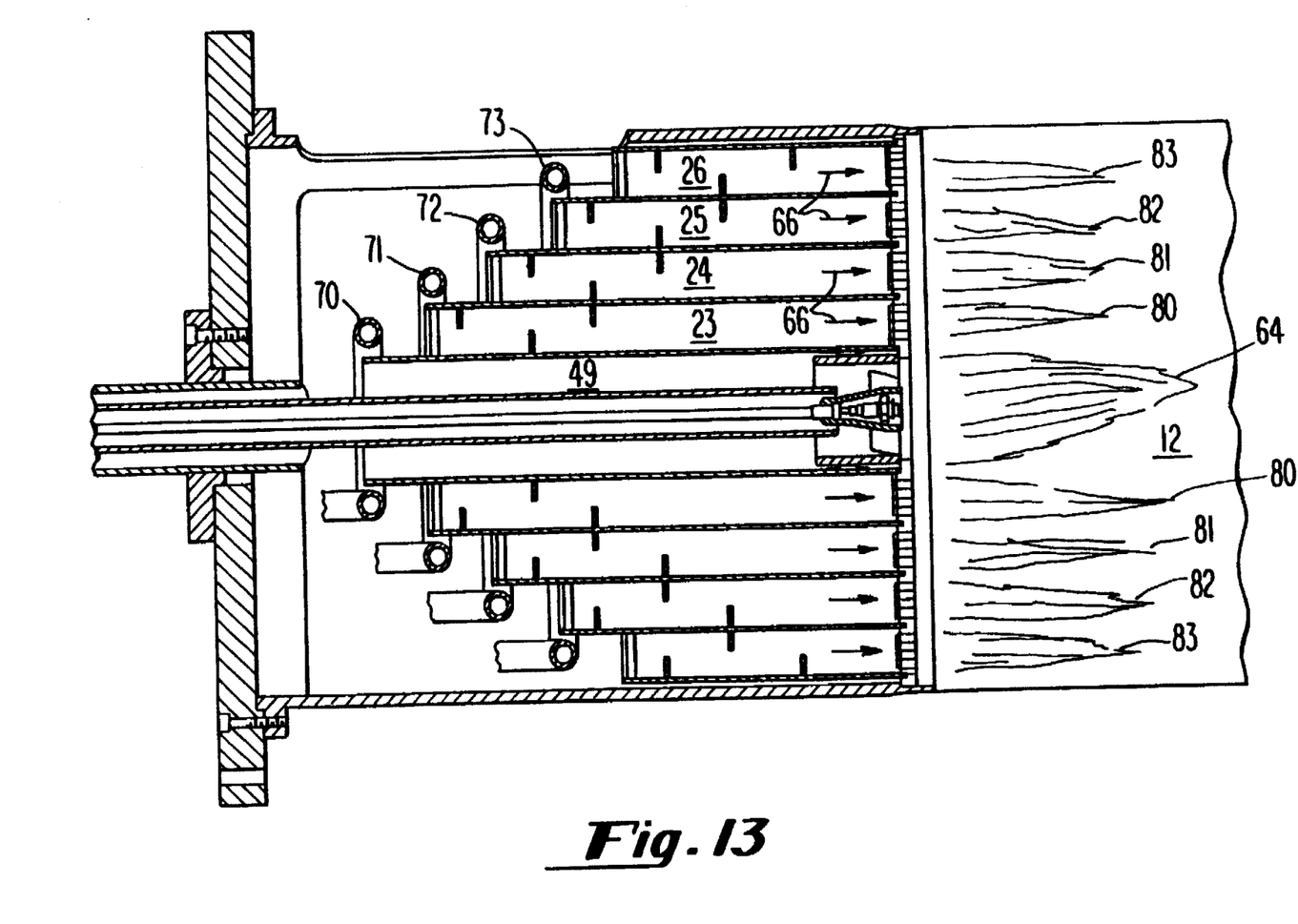
FIG. 13 is a longitudinal cross-section, partially schematic, through the combustor of the current invention in operation.

As a result of the mixing provided within the pilot 43, the local fuel/air ratio of the fuel and air mixture 67 flowing through the pilot, and the flame anchoring effect of the swirler vanes 44, a very stable pilot flame 64 is obtained in a central portion of the combustion zone 12 just downstream of the pilot 43, as shown in FIG. 13. Such combustion, in which the fuel and air are mixed in a fuel rich ratio immediately upstream of the flame front is generally referred to as "diffusion" type combustion.

Unfortunately, the diffusion type combustion associated with the pilot flame 64 results in locally high gas temperatures, and therefore, high rates of NOx formation. Thus, according to the current invention, as the speed of the gas turbine increases beyond ignition speed, the combustion of further fuel occurs in ultra-lean pre-mix type combustion, rather than further fuel rich diffusion type combustion. As is well known in the art, lean combustion minimizes local gas temperatures within the combustion zone and, therefore, the formation of NOx. As used herein, a lean fuel/air mixture is one in which the ratio of fuel to air is less that about 0.035 by weight.

According to the current invention, such ultra-lean pre-mixed combustion is obtained by introducing fuel 5 at lean fuel/air mixtures into the annular passages 23–26 surrounding the pilot fuel tube 42 via the fuel manifolds 70–73. As the fuel 5 flows through the annular passages 23–26, the length of the passages and the presence of the turbulence inducing baffles 33 promotes a high degree of mixing between the fuel and air. Such mixing ensures that the resulting streams of fuel and air 66, shown in FIGS. 4 and 13, have lean fuel/air ratios throughout. As a result, there are no locally fuel rich zones that would promote the generation of NOx. After flowing through the annular passages 23–26, the fuel/air mixtures 66 exit the pre-mixing zone 10, via the swirlers 59, and enter the combustion zone 12. In the combustion zone 12, the lean fuel/air mixtures 66 are ignited by the pilot flame 64, thereby creating additional concentric flame fronts 80–83 within the combustion zone 12 that surround the pilot flame 64.

In the preferred embodiment, fuel 5 is supplied to the annular passages 23–26 sequentially. Thus, as increased loading on the turbine 8 demands higher temperatures of the hot gas 7, additional fuel 5, beyond the fuel 5' available through the pilot fuel tube 42, is initially supplied to only the inner annular passage 23, via the fuel manifold 70 immediately upstream of that annular passage. After the fuel/air mixture flowing through annular passage 23 has been ignited, creating an annular flame 80 in a portion of the combustion zone surrounding the pilot flame 64, further increases in firing temperature are accomplished by increasing the fuel supplied to annular passage 23 by its fuel manifold 70 but only until the fuel/air ratio within that annular passage reaches approximately 0.035 by weight.

Thereafter, further increases in load are accomplished by supplying fuel to annular passage 24, via its fuel manifold 71, thereby creating a second annular flame 81 surrounding the first annular flame 80. Additional fuel is supplied to annular passage 24 until its fuel/air ratio reaches 0.035 by weight. Still further increases in load are accomplished by supplying fuel, in a similar fashion, to annular passage 25, via its fuel manifold 72, and lastly, to the outermost annular passage 26, via its fuel manifold 73. The result is a flame that extends radially outward within the combustion zone 12 as the firing temperature of the combustor 6 increases without ever creating a rich fuel/air ratio stream. In this manner, very lean fuel/air mixtures 66, and therefore, low NOx production, can be maintained over the entire operating range.

As a further refinement, according to the current invention, after combustion is established with respect to the lean fuel/air mixtures 66 flowing through each of the annular passages 23–26, supplemental pilot fuel 5" can be supplied to the innermost annular passage 49 via the fuel conduit 41. Again, the length of the passage 49 promotes good mixing of the fuel and air so as to create a lean fuel/air mixture 68, shown in FIG. 4. Subsequently, the pilot fuel 5' and its associated diffusion type combustion, which as previously discussed is a major source of NOx, can be eliminated and the lean pre-mix combustion of the supplemental pilot fuel 5" relied upon to maintain the pilot flame 64.

Typically, the flame stability of combustion at the lean fuel/air ratios with which the combustor 6 of the current invention operates, except for the pilot fuel/air mixture 67, is poor, thereby creating the possibility of blow-out. However, according to the current invention, good flame stability is achieved by the use of the pilot flame 64 in the center of the combustion zone and the use of swirlers 59, the cores 52 of some of which are plugged, at the discharge of each annular passage 23–26 that serve to anchor the flames 65.

Figure 14:
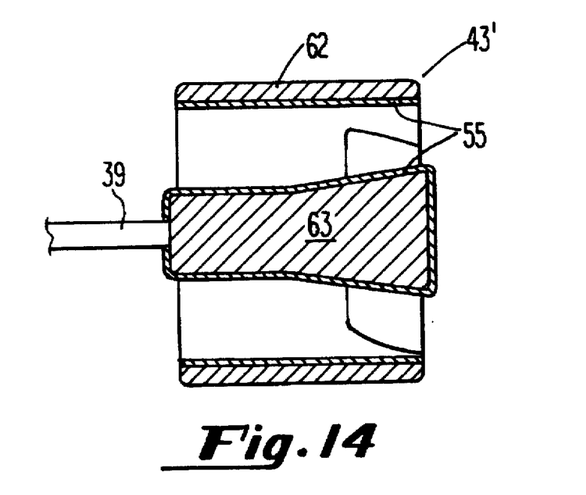
FIG. 14 is a longitudinal cross-section through an alternative embodiment of the pilot section of the combustor according to the current invention.

FIG. 14 shows another embodiment of the pilot 43' of the current invention in which the spark-type ignitor 40 has been replaced by an ignitor comprised of an element 63 heated by electrical resistance to a temperature sufficient to ignite the fuel. As shown in FIG. 14, in this embodiment, the inner surface of the outer ring 62 and the outer surface of the heating element 63 have been coated with a catalytic material, such as that previously discussed with respect to the swirler vanes 53.

Although the current invention has been discussed by reference gas fuel, the invention could also be practiced using other fuels. Also, although the invention has been discussed with reference to a combustor for a gas turbine, the invention could also be practiced with respect to combustors used in other types of machinery in which low NOx is desirable. Accordingly, the present invention may be embodied in other specific forms without departing from the spirit or essential attributes thereof and, accordingly, reference should be made to the appended claims, rather than to the foregoing specification, as indicating the scope of the invention.

We claim:
1. A gas turbine, comprising:
 a) a compressor for compressing air;
 b) a combustor for producing a hot gas by burning a fuel in said compressed air, said combustor having:
  (i) a plurality of concentrically arranged annular passages each having an inlet end and a discharge end;
  (ii) a first fuel discharge port for each of said annular passages for introducing a fuel therein; and
  (iii) means for separately controlling the introduction of fuel into each of said annular passages via its fuel discharge port; and
 c) a turbine for expanding said hot gas produced by said combustor.

2. The gas turbine according to claim 1, wherein said means for separately controlling the introduction of fuel into each of said annular passages via its fuel discharge port comprises an approximately toroidal manifold for each of said annular passages, each of said toroidal manifolds disposed proximate said inlet end of its respective annular passage, each of said first fuel discharge ports and a plurality of second fuel discharge ports formed in each of said toroidal manifolds and distributed circumferentially therearound.

3. The gas turbine according to claim 1, wherein each of said annular passages has means for introducing turbulence into a fluid flowing therein.

4. The gas turbine according to claim 3, wherein said turbulence inducing means comprises baffles.

5. The gas turbine according to claim 1, wherein said combustor further comprises a first swirler for each of said annular passages.

6. The gas turbine according to claim 1, wherein said combustor further comprises a plurality of swirlers for each of said annular passages, said swirlers forming an array of swirlers distributed circumferentially around each of said annular passages.

7. The gas turbine according to claim 6, wherein said swirlers are disposed proximate said discharge ends of said annular passages.

8. The gas turbine according to claim 6, wherein each of said swirlers comprises a plurality of vanes arranged circumferentially around said swirler.

9. The gas turbine according to claim 8, wherein each of said swirler vanes is coated with a catalytic material.

10. The gas turbine according to claim 6, further comprising a plate disposed downstream of said discharge ends of said annular passages, each of said swirlers disposed in said plate.

11. The gas turbine according to claim 1, wherein said combustor further comprises:

a) a fuel conduit enclosed by said annular passages and concentric therewith, said fuel conduit having a discharge port;

b) a swirler disposed downstream of said fuel conduit discharge port; and c) means for igniting a fuel/air mixture disposed downstream of said fuel conduit discharge port.

12. The gas turbine according to claim 11, wherein said igniting means comprises an element heated by electrical resistance.

13. The gas turbine according to claim 12, wherein said heated element is coated with a catalytic material.

14. The gas turbine according to claim 11, wherein each of said annular passages is a first annular passage, one of said first annular passages being innermost with respect to the other of said first annular passages, and wherein said combustor further comprises a second annular passage formed between said fuel conduit and said innermost first annular passage.

15. The gas turbine according to claim 14, further comprising a second fuel discharge port for introducing a fuel into said second annular passage.

16. The gas turbine according to claim 1, wherein at least a portion of said combustor is formed from a catalytic material.

* * * * *